UNITED STATES PATENT OFFICE.

NATHANIEL HATCH, OF EASTPORT, MAINE.

IMPROVEMENT IN COMPOSITION OF MATTER FOR RENDERING CLOTH WATER-PROOF.

Specification forming part of Letters Patent No. 2,505, dated March 23, 1842.

*To all whom it may concern:*

Be it known that I, the undersigned NATHANIEL HATCH, of Eastport, in the county of Washington and State of Maine, have discovered a new and useful Composition for Making Cotton and Linen Cloth Water-Proof and Pliable, viz:

Take one-half pound gum-shellac and one pint alcohol and put them in a tin kettle with a cover and suspend the kettle, with said contents, in a boiler of boiling water and keep the heat up till the gum dissolves. Then put one quart of boiled linseed-oil in the kettle with the shellac and boil them together till they are well mixed.

Secondly. Take one ounce of india rubber, cut it in very small pieces, and one quart of spirits turpentine and put them in another tin kettle with a cover, as before named, and suspend it, with the contents, in a boiler of boiling water and keep the heat up till it is dissolved. Then put two quarts of boiled linseed-oil in the kettle with the rubber and keep the heat up till they are completely mixed.

Thirdly. Take one pound of yellow hard soap and two quarts of water and boil them together till the soap is all dissolved. Then to make the composition take eight pounds white lead ground in oil, one gill coal-tar, six ounces lamp-black, one pound gold litharge, four quarts boiled linseed-oil, three quarts of the above-named solution of india-rubber, one gill of the solution of shellac, as above named, one pint of copal varnish. Mix them all well together. Then put one quart of the soap and water in the composition while the soap and water are boiling hot and stir them together till the whole is completely mixed together and then apply the composition to the cloth with a common paint-brush, and when the cloth is nearly dry, so that it will not rub off, apply the second coat of the composition, and when the second coat is nearly dry apply the third coat of the composition, which makes the cloth water-proof and pliable.

If I want to make any other color, I put other colored paint in enough to make such a color as I want—namely, for to make yellow I take chrome-yellow, or for green I take chrome-green, and to make white I leave out the lamp-black, &c.

I claim as my invention—

The compounding of the several articles, as mentioned above, and in their several proportions described, for the formation of a composition which, when put on cotton and linen cloth, renders it water-proof without losing its pliability.

In witness whereof I, the said NATHANIEL HATCH, hereunto subscribe my name, in the presence of two witnesses whose names are hereunto subscribed, on the 22d day of February, A. D. 1842.

NATHANIEL HATCH.

Witnesses:
JOSEPH C. NOYES,
LORENZO SABINE.